United States Patent [19]

Greggain et al.

[11] Patent Number: 5,440,653
[45] Date of Patent: Aug. 8, 1995

[54] IMAGE MIRRORING AND IMAGE EXTENSION FOR DIGITAL FILTERING

[75] Inventors: Lance Greggain, Woodbridge; Peter Mandl, Aurora, both of Canada

[73] Assignee: Genesis Microchip Inc., Ontario, Canada

[21] Appl. No.: 126,388

[22] Filed: Sep. 24, 1993

[51] Int. Cl.$^6$ .............................................. G06K 9/36
[52] U.S. Cl. ..................... 382/298; 382/260
[58] Field of Search ................. 382/49, 41, 22, 47, 382/54; 364/724.15, 724.19, 521; 395/2; 358/133; 341/155; 348/384

[56] References Cited

U.S. PATENT DOCUMENTS

| | | | |
|---|---|---|---|
| 4,283,765 | 8/1981 | Rieger | 364/521 |
| 4,674,125 | 6/1987 | Carlson et al. | 382/49 |
| 4,797,942 | 1/1989 | Burt | 382/41 |
| 4,825,396 | 4/1989 | Gazsi | 364/724.15 |
| 5,222,189 | 6/1993 | Fielder | 395/2 |
| 5,230,038 | 7/1993 | Fielder et al. | 395/2 |
| 5,231,397 | 7/1993 | Ridkosil | 341/155 |
| 5,253,059 | 10/1993 | Ansari et al. | 358/133 |
| 5,272,656 | 12/1993 | Genereux | 364/724.19 |

FOREIGN PATENT DOCUMENTS

| | | |
|---|---|---|
| 0045596 | 2/1982 | European Pat. Off. . |
| 0492725 | 7/1992 | European Pat. Off. . |
| WO93/12507 | 6/1993 | WIPO . |

*Primary Examiner*—Joseph Mancuso
*Attorney, Agent, or Firm*—Staas & Halsey

[57] ABSTRACT

In a multi-rate digital signal processing system for resizing an image in at least two segments using at least two symmetric T-tap digital filters each having T kernel-function weighting coefficients, where T is an odd plural integer, a first one of the segments being characterized by a first plurality of unfiltered pixels and second adjacent one of the segments being characterized by a second plurality of unfiltered pixels, a predetermined one of the unfiltered pixels being common to both the first and the second plurality at the image boundary of the two segments, the improvement comprising a method of seamlessly extending the image across the image boundary, comprising the steps of multiplying the $(T-1)/2$ of the first plurality and the second plurality of the unfiltered pixels adjacent the predetermined one of the pixels by two times respective ones of the kernel function weighting coefficients for generating the first and second mirrored half kernel intermediate multiplication products; multiplying the predetermined one of the pixels by a center-tap kernel-function weighting coefficient of the digital filter to generate an additional intermediate multiplication product; adding the first mirrored half-kernel intermediate multiplication products and the additional intermediate multiplication product to generate a first segment estimated boundary filtered output pixel; adding the second mirrored half-kernel intermediate multiplication products and the additional intermediate multiplication product to generate a second segment estimated boundary filtered output pixel; and averaging the first segment estimated boundary filtered output pixel and the segment.

5 Claims, 5 Drawing Sheets

IMAGE MIRRORING AND IMAGE EXTENSION FOR DIGITAL FILTERING

FIELD OF THE INVENTION

This invention relates in general to digital signal processing of images, and more particularly to a method and apparatus for filtering an image in multiple segments with half kernel filter mirroring for modifying the effects of boundary conditions.

BACKGROUND OF THE INVENTION

Digital processing of images is well known in the art, as exemplified by U.S. Pat. Nos. 4,674,125; 4,797,942 and 5,335,328. For example, it is well known to filter, re-size, project and warp images (see Wolberg, G. "Digital Image Warping", IEEE Computer Society Press 1988; Lim, J. S. "Two-dimensional Signal and image Processing", Prentice Hall 1990; and Elliot, D. F. "Handbook of Digital Signal Processing" Academic Press, 1987). The use of these and other prior art imaging effects is characterized by image continuity problems arising at the boundaries of the images (e.g. top/bottom, left/right). These problems are particularly acute during digital filtering due to the discontinuities at the image edges.

One solution to these problems involves mirroring the half kernel of a filter for moderating the effect of boundary conditions on processing of the image. Digital filters which are adapted to perform this function are typically implemented in integrated circuits. However, maximum clock rate and the sizes of elements used to provide line delays, etc., impose restrictions on the sizes of the images that such integrated circuits are capable of processing within a given time frame. The frame rate and the number of pixels per frame determines the number pixels per second that must be processed to maintain full frame processing. Thus, the maximum clock speed of an integrated circuit places a limitation on the maximum number of pixels that can be processed per second by a single integrated circuit. Software implementations of such digital filters are limited by the maximum throughput of the controlling CPU.

Accordingly, it would be desirable in a digital signal processing system to provide full frame processing of images with the digital filter function spread over a plurality of integrated circuit chips operating in parallel, and each operating at a high clock rate for maximizing the number of pixels processed per second per chip.

However, in order to realize such a digital signal processing system, the image must be extended seamlessly between respective ones of the parallel-operating digital filters, which is a feature currently unavailable in the prior art.

BRIEF DESCRIPTION OF THE DRAWINGS

A detailed description of the prior art and of the preferred embodiment of the present invention is provided herein below with reference to the following drawings, in which.

DETAILED DESCRIPTION OF THE PRIOR ART AND OF THE PREFERRED EMBODIMENT OF THE PRESENT INVENTION

Figure 1:
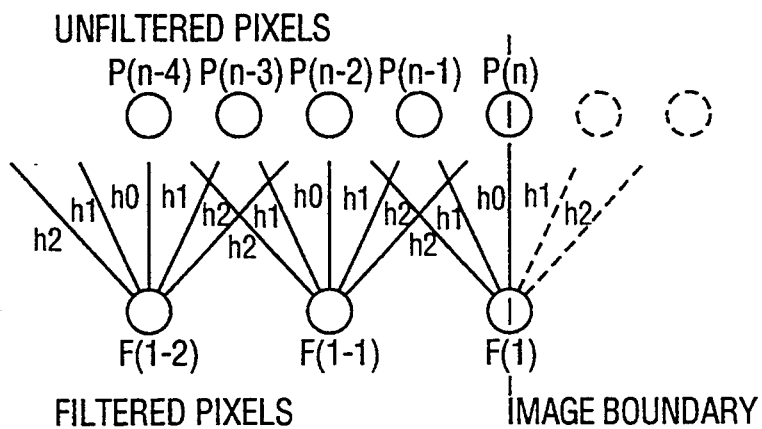
FIG. 1 shows the results of mirroring the half kernel of a filter in accordance with the prior art.

FIG. 1 illustrates schematically the prior art technique of mirroring the half kernel of a filter for moderating the effects of boundary conditions on image processing. The last full output pixel, $F(j-1)$, is created by filtering pixels $P(n-4)$ to $P(n)$ with $P(n-2)$ being the centre pixel. The output pixel $F(j)$ cannot be generated from existing input pixels. For the five-tap filter illustrated in FIG. 1, the last full output pixel, $F(j-1)$ and the desired output pixel, $FC(j)$, may be represented as follows:

$$F(j-1)=h2*P(n-4)+h1*P(n-3)+h0*P(n-2)+h1*P(n-1)+h2*P(n)$$

$$FC(j)=h2*P(n-2)+h1*P(n-1)+h0*P(n)+h1*P(n+1)+h2*P(n+2)$$

The actual output pixel $F(j)$ is created by approximating $FC(j)$. In this approximation, the missing input pixels are created by repeating pixels from within the current image. Thus, the contribution to the output pixel $F(j)$ from $P(n-1)$ and $P(n-2)$ is:

$$F(j)=h2*P(n-2)+h1*P(n-1)+h0*P(n)+h1*P(n-1)+h2*P(n-2)$$

By mirroring the half kernel of the filter for the first pixel and the last pixel of every line, and on the first and last line of each image in vertical direction, the effects of boundary conditions on the processed image are moderated.

As discussed above, in order to extend an image in all filtering or other digital signal processing (DSP) applications, the image must be separated into segments and processed by individual digital signal processing chips.

If the image is divided vertically, the last column in the first image segment must be repeated as the first column of the second image segment. The half kernel of the filter must be mirrored at the image segment boundary. According to the present invention, a system is provided for adding together and averaging the output column at the boundary (i.e. the last column of the first segment and the first column of the second segment) from both segments to create the final output column. Similarly, if the image is divided horizontally, then the row at the boundary of the input image segments is repeated and the row at the output image boundary is added and averaged. According to the present invention, the image, can also be divided into multiple segments by performing the same function on the edges that are common to more than one segment.

For the specific case of resampling followed by digital signal processing such as filtering, the interpolated pixels generated from a fractional filter must be aligned in such a manner that the first and last filtered output pixel of each line or the first and last filtered output line of each image align exactly with the input pixels and lines, respectively. In accordance with the present invention, the row or column at the output image boundary of both segments is added and averaged.

Specifically, in the case of resampling followed by decimating filtering, as described in U.S. Pat. No. 5,335,328, the subject matter of which is incorporated herein by reference, the interpolated pixels generated by a fractional filter must be aligned in such a manner that the first and last filtered output pixel for each line or the first and last filtered output line of each image align exactly with the input pixels and lines, respectively. The input column or line at the shared edge is repeated in both image segments prior to resampling and after resampling. For the output image to be numerically accurate, the number of input pixels and lines must be the same in each input segment and the number of input pixels and lines must be the same in each output segment. The error that is caused by not having these numbers match exactly varies for the re-size factor and image size. However, by adding and averaging the row or column at the output image boundary of both segments, the apparatus and method of the present invention alleviates any such error.

Figure 2:
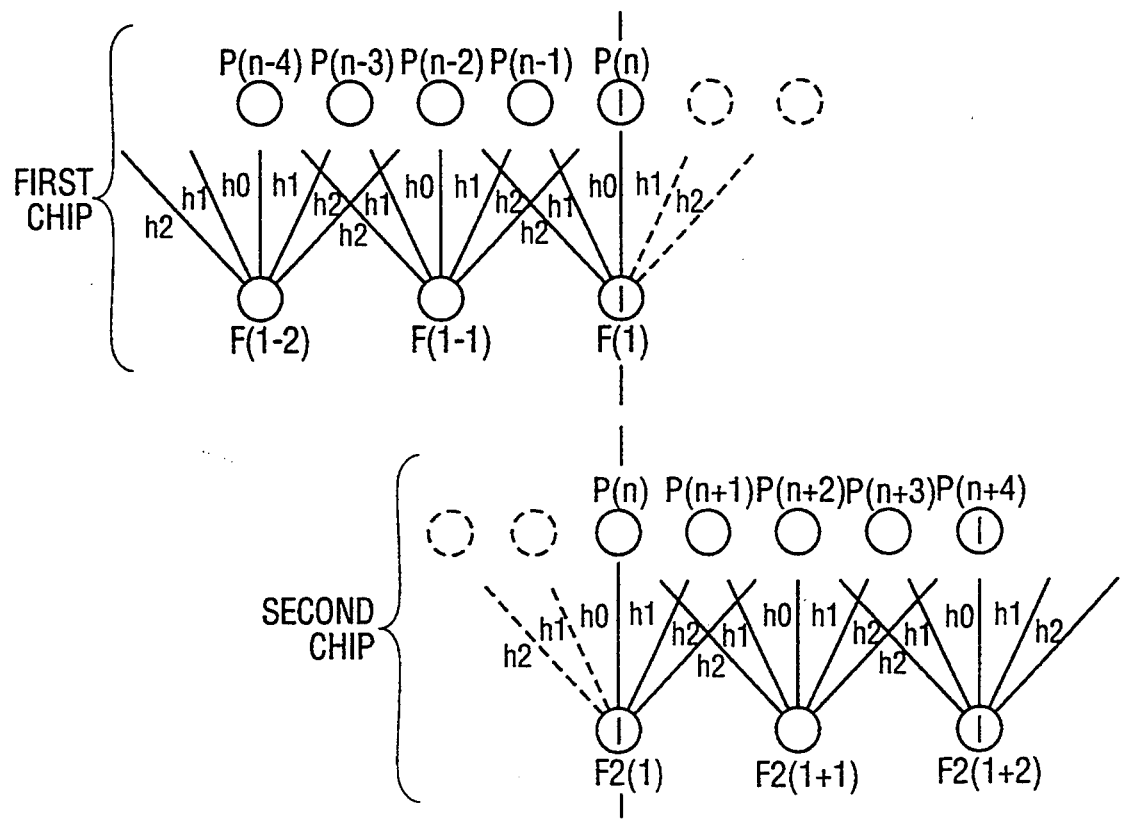
FIG. 2 shows the results of filtering an image as a two image segment, in accordance with the present invention.

Turning now to FIG. 2, a detailed analysis of the filtering of image boundaries shared between two chips is provided. The present invention is based upon two important principles. First, the unprocessed pixel stream . . . , $P(n-4)$, $P(n-3)$, $P(n-2)$, $P(n-1)$, $P(n)$, $P(n+1)$, $P(n+2)$, $P(n+3)$, $P(n+4)$, . . . must appear as though only one chip is being used. Second, the filtered pixels . . . , $F(j-2)$, $F(j-1)$, $FC(j)$, $F2(j+1)$, $F2(j+2)$, . . . must also appear to have been generated by a single chip.

In the five-tap FIR filter shown in FIG. 2, if the last pixel of a line in the first filter is the same as the first pixel of a line in the second filter (i.e. the pixel is processed by both filters), then $P(n)$ of the unfiltered pixels in the second chip is equal to $P(n)$ of the unfiltered pixels in the first chip.

The filtered pixels from the first chip $F(j-2)$ and $F(j-1)$ and all of the other pixels except for $F(j)$ will be generated from actually existing unfiltered input pixels in the usual manner. Likewise, the filtered pixels from the second chip $F2(j+1)$, $F2(j+2)$ and all other pixels except for $F2(j)$ will be generated from existing input pixels in the usual manner.

The filtered output pixels at the boundary are $F(j)$ from the first chip and $F2(j)$ from the second chip. These pixels may be created by doubling the half kernel according to the technique discussed above.

$$F(j)=2*h2*P(n-2)+2*h1*P(n-1)+h0*P(n)$$

$$F2(j)=2*h2*P(n+2)+2*h1*P(n+1)+h0*P(n)$$

The desired output pixel is $FCj$.

$$FCj=h2*P(n-2)+h1*P(n-1)+h0*P(n)+h1*P(n+1)+h2*P(n+2)$$

$FC(j)$ can be created exactly by taking the average of $F(j)$ and $F2(j)$.

$$FC(j)=(F(j)+F2(j))/2$$

Figure 3:
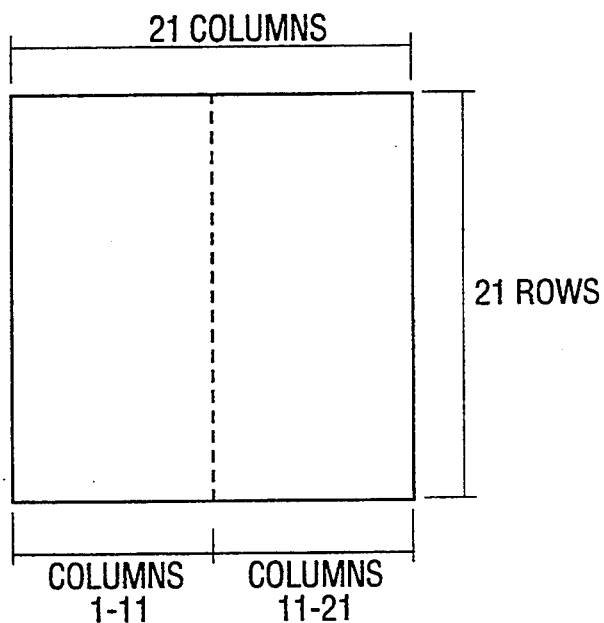
FIG. 3 shows the separation of an image into two segments for processing in accordance with the principles of the present invention.
Figure 4A:
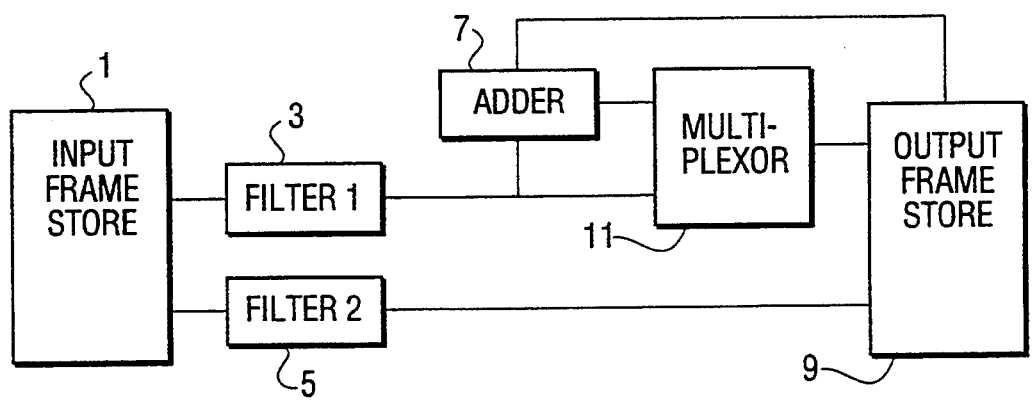
FIG. 4A is a block diagram of circuit elements for filtering the image shown in FIG. 3, according a first embodiment of the present invention.

FIG. 3 is a schematic representation of an image separated into two sub-images for processing via the circuit shown in FIG. 4A. The image in FIG. 3 comprises 21 rows and 21 columns which are stored in an input frame store 1 (FIG. 4A). Columns 1 through 11 of the image are filtered by a first digital filter 3 with half kernel reflection at the edges of the image. Columns 11 through 21 of the image are filtered by a second digital filter 5 which also performs half kernel reflection at the edges of the image. An adder 7 has a pair of inputs connected to the output of filter 3 and to the output of an output frame store 9. An output of adder 7 is connected to the first input of a multiplexer 11 and the second input of multiplexer 11 is connected directly to the output of filter 3. The output of multiplexer 11 is connected to one input of output frame store 9 while the second input is connected to the output of filter 5.

In operation, unfiltered input pixels . . . , $P(n-4)$, $P(n-3)$, $P(n-2)$, $P(n-1)$ and $P(n)$ are transmitted from the input frame store 1 to filter 3 which, in response, generates filtered output pixels . . . , $F(j-2)$, $F(j-1)$ and $F(j)$ in the usual manner. These output pixels are transmitted to output frame store 9 via multiplexer 11. In a similar manner, input frame store 1 transmits unfiltered input pixels $P(n)$, $P(n+1)$, $P(n+2)$, $P(n+3)$, $P(n+4)$ . . . , to filter 5 which, in response, generates output filtered pixels $F2(j)$, $F2(j+1)$, $F2(j+2)$, . . . , which are transmitted to output frame store 9. As discussed, filters 3 and 5 operate in parallel so that the first output pixel from filter 5 (ie. $F2(j)$) is stored in output frame store 9 prior to generation of the last pixel $F(j)$ of filter 3.

The last filtered pixel $F(j)$ from filter 3 is summed with the first filtered pixel $F2(j)$ in adder 7 and then shifted one bit to the right (divide-by-two) for generating the desired output pixel $FC(j)=(F(j)+F2(j))/2$ which is then transmitted via multiplexer 11 for storage in output frame store 9. In this way, seamless image extension is provided for the simplified double-image scenario illustrated in FIG. 3. By applying the same principles, with additional filters, adders and multiplexers, the system of the present invention may be extended to provide multiple image extension.

Figure 4B:
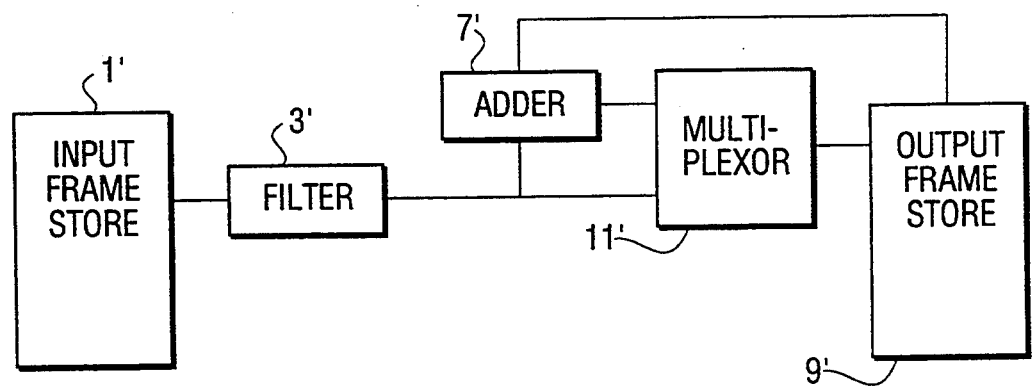
FIG. 4B is a block diagram of circuit elements for filtering the image shown in FIG. 3, according a second embodiment of the present invention.

Turning to the alternative embodiment of FIG. 4B, a circuit is shown for filtering the image of FIG. 3 in multiple passes using a single filter. Like reference numerals are used to identify like components of the circuit shown in FIG. 4A, and the operation is substantially the same except that the two sub-images are processed via a single filter 3' twice instead of passing through two filters 3 and 5 as in the embodiment of FIG. 4A. Adder 7' functions the same as the adder 7 in FIG. 4A for averaging the common boundary pixels. When the first sub-image to be processed is bounded by columns 1-11 (FIG. 3), then the averaging is performed on the first pixel of each output line of the sub-image bounded by columns 11-21. When the sub-image bounded by columns 11-21 is processed first, then the last pixel of each output line from the sub-image bounded by columns 1-11 is processed via the adder 7'.

The advantage of filtering using a single filter 3' (FIG. 4B) is reduced hardware cost, whereas the advantage of filtering using two filters 3 and 5 (FIG. 4A) is increased pixel processing speed.

In the case of digital signal processing in the form of resampling, followed by other processing such as filtering of the resampled data, the resampled data must be aligned with the input data at the boundaries of the image. According to prior art resampling techniques, an output grid is generated having a time step or increment (Tinc) determined by a source input grid and the target output grid. In the case of linear remapping, the output grid is generated by creating one output pixel for every time step or increment, starting with the initial sample from the input grid, until the output grid exceeds the input grid. The resampled pixels are then processed by filters in the usual manner.

According to this prior art technique, the time step or increment is calculated as follows:

Tinc=Src/Tar; where Tinc represents the time step increment, Src represents the source pixels/line, and Tar represents the target pixels/line.

Figure 5:
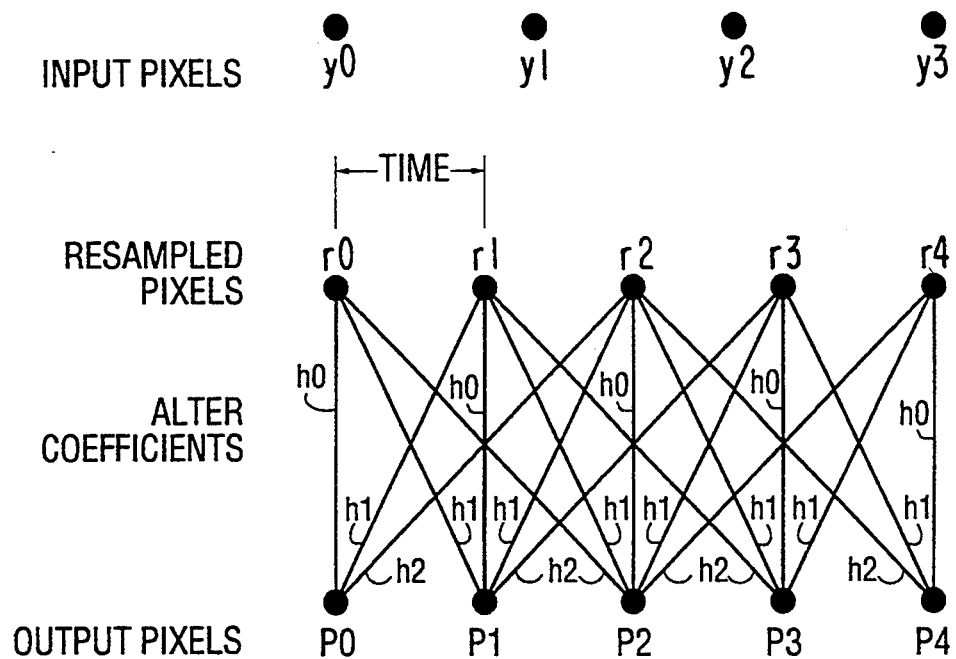
FIG. 5 shows the mis-alignment of resampled pixels with input pixels where the increment between resampled pixels is determined according to the prior art.

Thus, for the remapping shown in FIG. 5 from four source pixels/line to five target pixel/lines, Tinc=4/5=0.8. However, the last resampled pixel on each line (r4) is not aligned with the last input pixel (Y3) on the input grid.

In accordance with the present invention, means are provided for recalculating the time step increment Tinc to provide spatial alignment of interpolated pixels with the input grid, as follows:

Tinc=(Src−1)/(Tar−1).

Figure 6B:
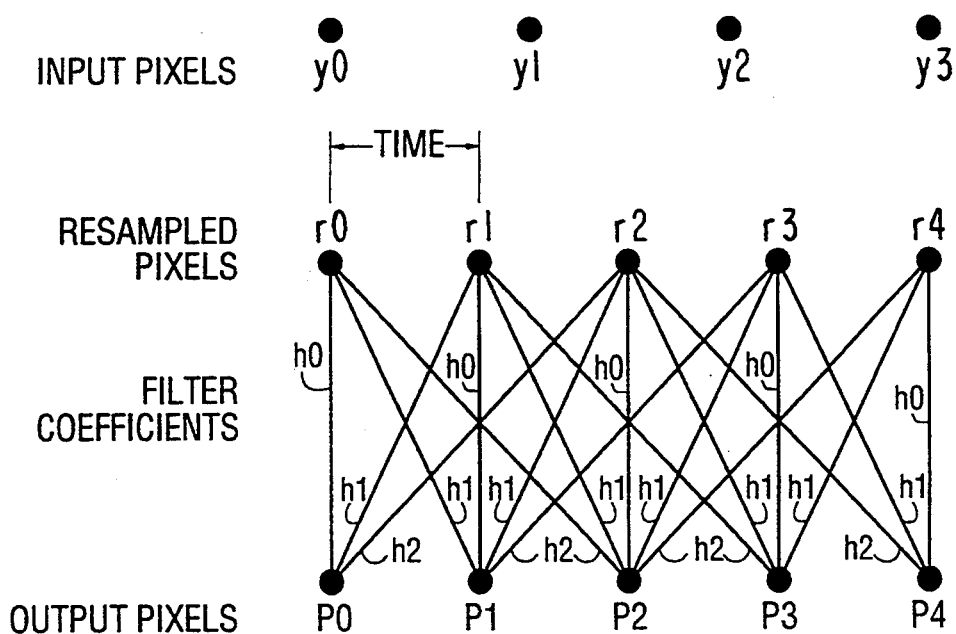
FIG. 6B shows the spatial pixel relationship between input pixels and resampled pixels using the time step increment generated by the circuit of FIG. 6A.
Figure 6A:
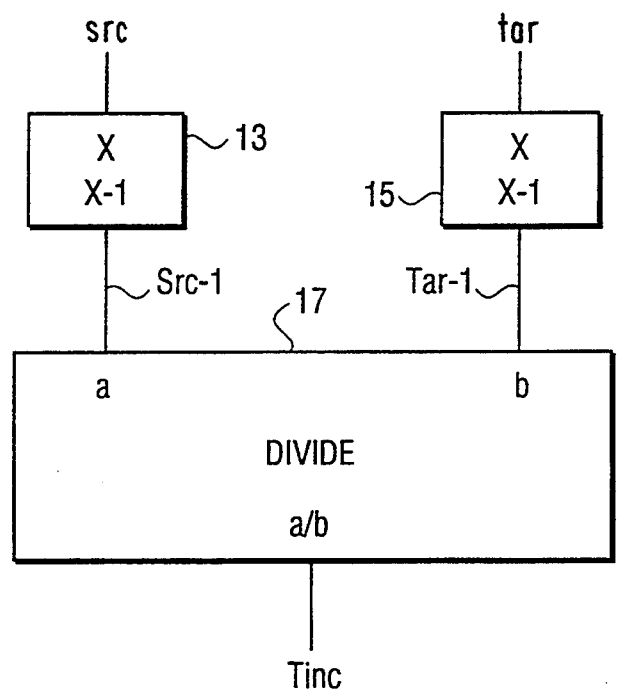
FIG. 6A is a block diagram of a circuit for generating a time step movement signal from source and target grid inputs in accordance with another aspect of the invention.

With reference to FIG. 6A, a circuit is shown for generating the time step increment Tinc. The source value Src of input pixels/line is applied to an input (X) of a first subtracter 13 for subtracting "1" from the input, yielding Src−1. Likewise, the target value of output pixels/line is applied to the input (X) of a second subtracter 15 for subtracting "1" from the input, yielding Tar−1. The digital outputs of subtractors 13 and 15 are applied to "a" and "b" inputs, respectively, of a divider 17 which yields an output of a/b=(Src−1)/(Tar−1)=Tinc.

FIG. 6B illustrates the effect of generating a modified time step increment Tinc on spatial alignment of the interpolated pixels with the input pixel grid. Specifically, as can be seen, the interpolated output pixels at the image boundaries (i.e. $P_0$ and $P_4$) are aligned with the input pixels at the image boundary (i.e. $Y_0$ and $Y_3$). In the examples of FIG. 6B, Tinc=(4−1)/(5−1)=¾=0.75.

As an alternative to the use of the subtractors 13 and 15, loadable down counters may be used in which the loaded input values are clocked downwardly by 1 after being loaded. Furthermore, as an alternative to the hardware embodiment of FIG. 6A, the calculation of Tinc may also be conveniently effected in a computer executing appropriate software.

With the re-mapping adjusted to ensure that the re-mapped grid is aligned with the input grid at the image boundary using the principles of the present invention, the above-discussed extension methodology can be effected on the resampled image in accordance with the apparatus discussed above. That is, the resampled image can be separated into two segments where the last column of the first resampled segment is repeated as the first column of the second resampled segment. The image boundary can be mirrored and the last output column of the first segment can be averaged with the first output column of the second segment to create the final output column, in the manner discussed above with reference to FIGS. 2–4.

In the case where resampling is followed by multi-rate processing such as downsampling (as discussed in U.S. patent application Ser. No. 07/766,128) edge effects may be generated and prior art techniques have proven to be inadequate for accommodating such processing. In particular, according to the prior art, the calculation of the time step increment (Tinc) is obtained from the user specified source grid and the user specified final output target grid in a manner similar to that discussed with reference to FIG. 5. The calculated time step increment is accumulated and used to generate coefficients for linear interpolation of the input pixels. The linear interpolated pixels are then decimated utilizing integer filters. According to the prior art system described in U.S. patent application Ser. No. 07/766,128, the time step increment (Tinc) parameter is calculated as follows:

Tinc=Src/(Tar.2.D), wherein D represents a normalizing parameter based on filter order.

Figure 7:
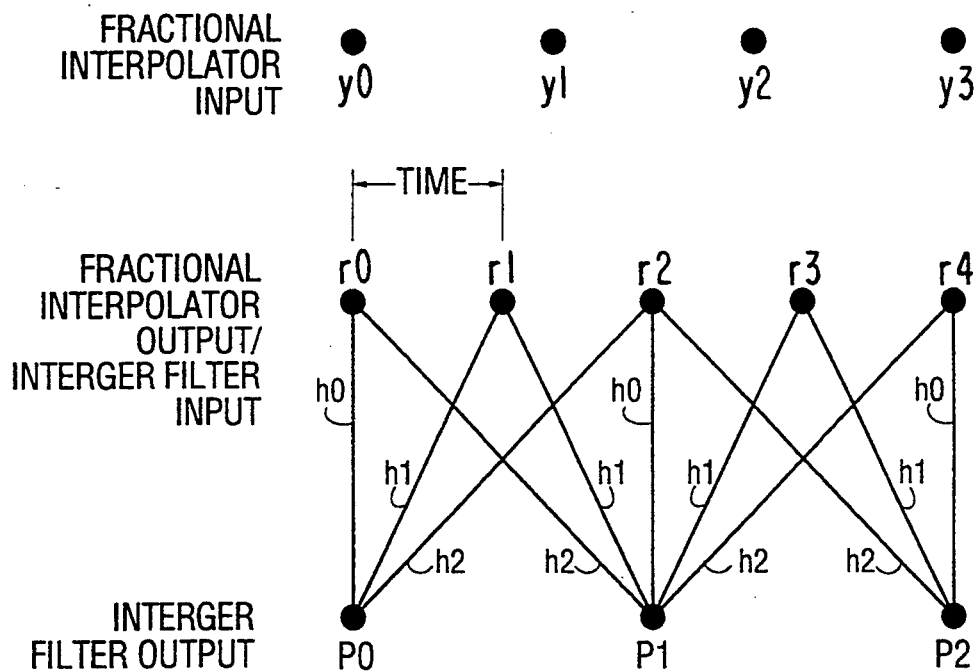
FIG. 7 shows the spatial pixel relationship of fractional interpolator output pixels to the fractional interpolator input pixels utilizing an increment determined according to the prior art.

The spatial misalignment of pixels resulting from the use of this prior art calculated time step increment is shown with reference to FIG. 7 for a 5-tap FIR filter.

Thus, according to the present invention, means are provided for generating a modified time step increment Tinc, as follows:

$$Tinc = \frac{Src - 1}{(Tar - 1) \cdot 2 \cdot D}$$

Figure 8A:
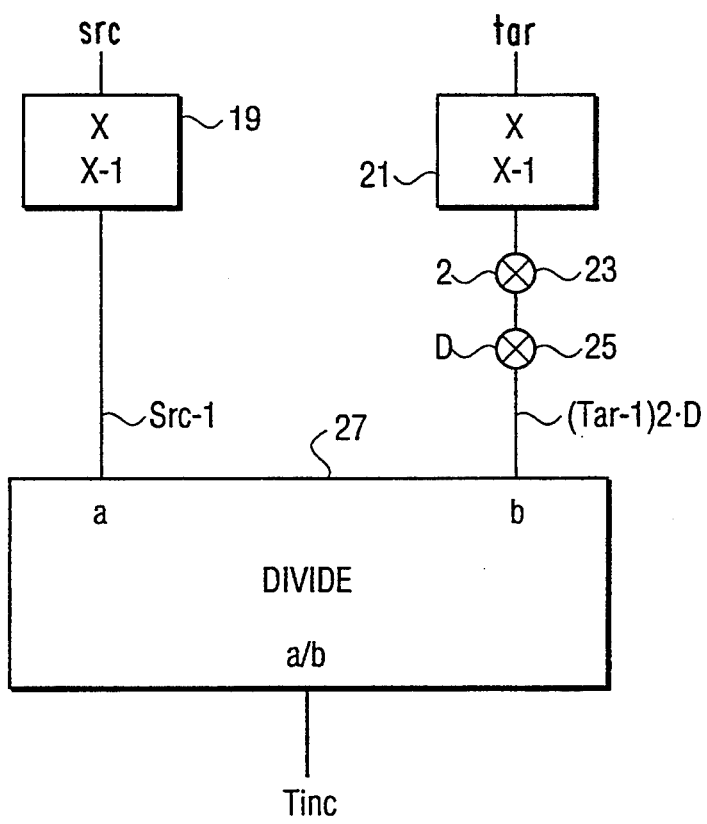
FIG. 8A is a block diagram of a circuit for generating a time step movement signal from source and target grid inputs in accordance with a further aspect of the invention.

With reference to FIG. 8A, a circuit is shown for generating the time step increment Tinc. The source value Src of input pixels/lines is applied to an input (X) of a first subtracter 19 for subtracting "1" from the input, yielding Src−1. Likewise, the target value of output pixels/lines is applied to the input (X) of a second subtracter 21 for subtracting "1" from the input, yielding Tar−1. This value is then multiplied by 2 in a first multiplier 23 and the product of multiplier 23 is multiplied by D in a second multiplier 25, yielding a final product value of (Tar−1)2.D. This product value is applied to the "B" input of a divider 27 while the value Src−1 from subtracter 19 is applied to the "A" input of divider 27. The divider 27 thus yields an output of a/b=Tinc;

$$Tinc = \frac{Src - 1}{(Tar - 1) \cdot 2 \cdot D}$$

Figure 8B:
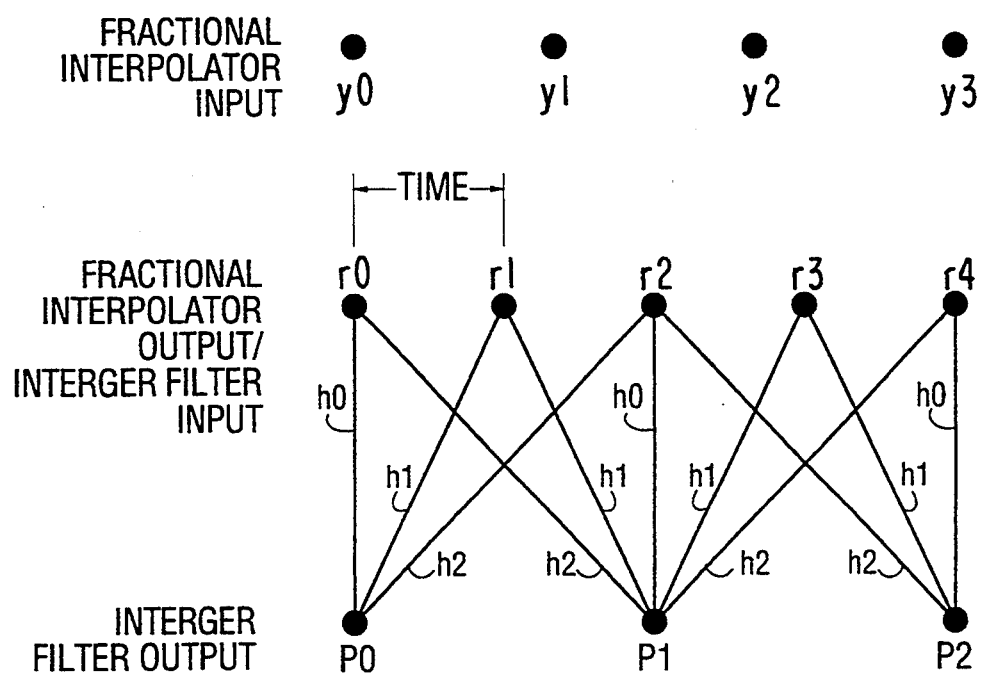
FIG. 8B shows the spatial pixel relationship between fractional interpolator input pixels and fractional interpolator output pixels using an increment determined in accordance with the present invention.

For a 5 tap filter, FIG. 8B illustrates the resulting spatial alignment of interpolated pixels with the integer filter kernel where $$Tinc = \frac{4-1}{(3-1\cdot 2\cdot)} = \frac{3}{4} = 0.75$$

By utilizing the modified Tinc value according to the present invention, the boundary conditions are established as shown in FIG. 8B so that the first and last interpolated pixels and output pixels line up exactly with the first and last pixels of the input pixel stream. That is, in FIG. 8B, r4 of the unfiltered pixels of the first chip is exactly aligned with the last pixel $Y_3$ in the current line of the input image of the first chip.

In summary, according to the present invention, the time step increment (Tinc) is generated so that the last interpolated pixel in a column or line corresponds exactly with the last input pixel in the original column or line. If the resize factors are the same, the interpolated pixel streams processed through separate filters will appear as though they have been created by a single pixel stream utilizing a single filter chip. To establish common resize factors, all filter chips must have the same number of input pixels and output pixels. Given that the last input pixel of the first chip corresponds to the first input pixel of the second chip, and the chips have the same number of input pixels and output pixels, the interpolated pixel stream will appear as though there has been only one chip, except that pixel P(n) is repeated.

In some cases, the resize factors are exactly the same. This occurs when the time step increment Tinc is the same in both image segments. For example, if the number of input pixels in both segments is equal and the number of output pixels in both segments is equal, then the resize factors for both segments are identical. This can also occur when the numbers of pixels are different. In situations where the resize factors are not identical, image boundary problems are not objectionable so long as the resize factors are similar.

With remapping adjusted to ensure that the remapped grid aligns with the input grid at the image boundary, and the output grid is aligned to the input boundary by generation of a modified time increment Tinc according to the present invention, the extension technique discussed above with reference to FIGS. 3 and 4 may be performed on the resampled image. That is, the resampled image can be separated into two segments where the last column in the first resampled segment is repeated as the first column of the second resampled segment. The image boundary can be mirrored in the usual manner and the last output column of the first segment can be averaged with the first output column of the second segment to create the final output column, in accordance with the principles of the present invention.

Modifications and alternative embodiments are possible within the sphere and scope of this invention as defined by the claims appended hereto.

We claim:

1. In a multi-rate digital signal processing system for re-sizing an image in at least two segments using at least one symmetric T-tap digital filter having T kernel-function weighting coefficients, where T is an odd plural integer, such that $(T-1)/2$ kernel function weighting coefficients are provided on either side of a centre-tap kernel-function weighting coefficient of said symmetric T-tap digital filter, a first one of said segments being characterized by a first plurality of unfiltered pixels and second adjacent one of said segments being characterized by a second plurality of unfiltered pixels, a predetermined one of said unfiltered pixels being common to both said first and said second plurality at the image boundary of said two segments, the improvement comprising a method of seamlessly extending said image across said image boundary, comprising the steps of:

i) multiplying the $(T-1)/2$ of said first plurality and said second plurality of said unfiltered pixels adjacent said predetermined one of said unfiltered pixels by two times respective ones of said $(T-1)/2$ kernel-function weighting coefficients for generating the first and second mirrored half kernel intermediate multiplication products;

ii) multiplying said predetermined one of said unfiltered pixels by said centre-tap kernel function weighting coefficient of said digital filter to generate an additional intermediate multiplication product;

iii) adding said first mirrored half-kernel intermediate multiplication products and said additional intermediate multiplication product to generate a first segment estimated boundary filtered output pixel;

iv) adding said second mirrored half-kernel intermediate multiplication products and said additional intermediate multiplication product to generate a second segment estimated boundary filtered output pixel;

v) averaging said first segment estimated boundary filtered output pixel and said segment estimated boundary filtered output pixel to generate an average; and vi) generating a further filtered output pixel at said boundary using said average to resize the image.

2. A method of filtering an image in at least two segments using at least one T-tap digital filter having T kernel-function weighting coefficients, where T is an odd plural integer, such that $(T-\frac{1}{2})$ kernel function weighting coefficients are provided on either side of a centre-tap kernel function weighting coefficient of said symmetric T-tap digital filter, a first one of said segments being characterized by a first plurality of unfiltered pixels in each line of said image and a second adjacent one of said segments being characterized by a second plurality of unfiltered pixels in each line of said image, a predetermined one of said unfiltered pixels being common to both said first and said second plurality at the image boundary of said two segments, comprising the steps of:

a) with the exception of where the kernel of said digital filter is greater than or equal to $(T-1)/2$ pixels from said image boundary, for each successive group of T ones of said first plurality and said second plurality of unfiltered pixels, i) multiplying each pixel by a respective one of said kernel-function weighting coefficients to generate a first plurality of intermediate multiplication products, and ii) adding said first plurality of intermediate multiplication products to generate a filtered output pixel, b) where the kernel of said digital filter is less than $(T-1)/2$ pixels from said image boundary but is not coincident therewith, such that for each further successive group of T ones of said first plurality and said second plurality of unfiltered pixels there is at least one pair of symmetric unfiltered pixels wherein one pixel of said pair lies inside said image boundary and another pixel of said pair lies outside of said image boundary, i) for each such pair of symmetric unfiltered pixels in each further successive group, multiplying said one pixel which lies inside said image boundary by two times a respective one of said kernel-function weighting coefficients to generate a second plurality of intermediate multiplication products, ii) multiplying successive remaining unfiltered pixels of each further successive group by further respective kernel-function weighting coefficients to generate a third plurality of intermediate multiplication products, (iii) for each said further successive group adding said second and said third plurality of intermediate multiplication products to generate a further filtered output pixel, c) where the kernel of said digital filter is coincident with said predetermined one of said unfiltered pixels, i) multiplying $(T-1)/2$ of said first plurality and said second plurality of said unfiltered pixels adjacent said predetermined one of said unfiltered pixels by two times respective ones of said $(T-1)/2$ kernel-function weighting coefficients for generating first and second mirrored half-kernel intermediate multiplication products, ii) multiplying said predetermined one of said unfiltered pixels by said centre-tap kernel-function weighting coefficient of said digital filter to generate an additional intermediate multiplication product, iii) adding said first mirrored half-kernel intermediate multiplication products and said additional intermediate multiplication product to generate a first segment estimated boundary filtered output pixel, iv) adding said second mirrored half-kernel intermediate multiplication products and said additional intermediate multiplication product to generate a second segment estimated boundary filtered output pixel, v) averaging said first segment estimated boundary filtered output pixel and said segment estimated boundary filtered output pixel to generate an average; and vi) generating a further filtered output pixel at said boundary using said average to filter the image.

3. Apparatus for digital filtering an image in at least two segments, a first one of said segments being characterized by a first plurality of unfiltered pixels $P(n-X)$, ..., $P(n-2)$, $P(n-1)$, $P(n)$ in one of either each line or each column of said image, and a second one of said segments being characterized by a second plurality of unfiltered pixels $P(n)$, $P(n+1)$, $P(n+2)$, ..., $P(n+X)$ in one of either each line or each column of said image, where $X+1$ represents the number of pixels in said one of either each line or each column of said segments, wherein said unfiltered pixel $P(n)$ is common to both said first and said second plurality at the image boundary of said two segments, comprising:

a) a first symmetric T-tap digital filter having T kernel-function weighting coefficients, where T is an odd plural integer, for filtering said first plurality of unfiltered pixels $P(n-X)$, ..., $P(n-2)$, $P(n-1)$, $P(n)$ in said one of either each line or each column of said image, and in response generating a first plurality of filtered pixels $F(j-(T-1)/2)$, ..., $F(j-1)$, $F(j)$;

b) a second symmetric T-tap digital filter operating in parallel with said first T-tap filter, said second T-tap filter having T kernel-function weighting coefficients, for filtering said second plurality of unfiltered pixels $P(n)$, $P(n+1)$, $P(n+2)$, ..., $P(n+X)$ in said one of either each line or each column of said image, and in response generating a second plurality of filtered pixels $F2(j)$, $F2(j+1)$, ..., $F2(j+(T-1)/2)$;

c) output storage means for receiving and storing said filtered pixels $F(j-(T-1)/2)$, ..., $F(j-1)$ from said first T-tap digital filter and said filtered pixels $F2(j)$, $F2(j+1)$, ..., $F2(j+(T-1)/2)$ from said second T-tap digital filter;

d) an adder having inputs connected to said first T-tap filter and said output storage means for summing said filtered pixels $F(j)$ and $F2(j)$ to generate a summation value, and dividing said summation value by two to generate a further filtered pixel $FC(j)$ at said image boundary; and e) a multiplexer having inputs connected to said first T-tap digital filter and said adder and an output connected to said output storage means, for transmitting said filtered pixels $F(j-(T-1)/2)$, ..., $F(j-1)$ from said first T-tap digital filter and substituting said further filtered pixel $FC(j)$ for said pixel $F2(j)$ in said output storage means.

4. A system for resampling input pixels of an image occurring at a first rate of Src pixels/line to produce resampled pixels at a second rate of Tar pixels/line so that the input pixels and resampled pixels are aligned at the boundaries of said image, comprising:

a) means for decrementing said first rate Scr by one and in response outputting a decremented first rate Src−1;

b) means for decrementing said second rate Tar by one and in response outputting a decremented second rate Tar−1;

c) means for dividing said decremented first rate Src−1 by said decremented second rate Tar−1 and in response outputting a time step increment Tinc; and d) means for resampling said input pixels at said step increment Tinc and producing said resampled pixels at said second rate of Tar, with alignment of said input pixels and said resampled pixels at said boundaries of said image.

5. The system of claim 4, further comprising means for multiplying said decremented second rate Tar−1 by 2D when said resampled pixels are to be subjected to multirate processing via a digital filter, where D represents a normalizing parameter based on the order of said digital filter.

* * * * *

UNITED STATES PATENT AND TRADEMARK OFFICE
CERTIFICATE OF CORRECTION

PATENT NO. : 5,440,653
APPLICATION NO. : 08/126388
DATED : August 8, 1995
INVENTOR(S) : Greggain et al.

It is certified that error appears in the above-identified patent and that said Letters Patent is hereby corrected as shown below:

On the Title page and Col. 1 lines 2 & 3
Item [54] Title: Please change the title from "IMAGE MIRRORING AND IMAGE EXTENSION FOR DIGITAL FILTERING" to -- IMAGE FILTERING AND IMAGE EXTENSION FOR DIGITAL FILTERING --

Signed and Sealed this

Tenth Day of February, 2009

JOHN DOLL
*Acting Director of the United States Patent and Trademark Office*